INVENTOR
HANS E. REUSSER
BY Emory L. Groff Jr.
ATTORNEY

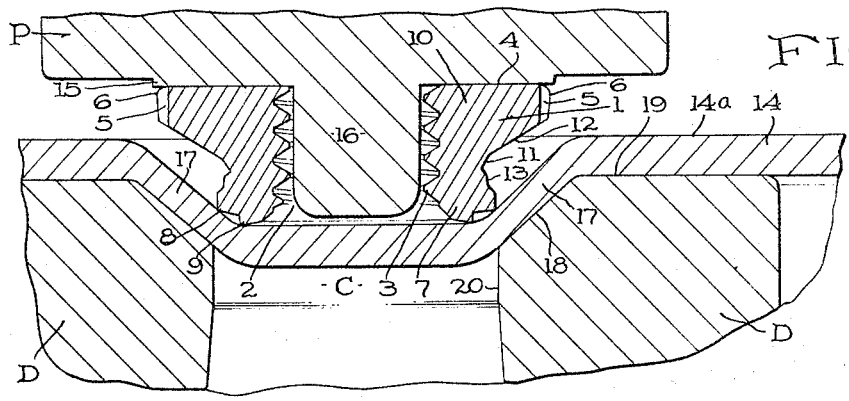

United States Patent Office 3,276,499
Patented Oct. 4, 1966

3,276,499
FLUSH-DRIVEN SELF-PIERCING AND CLINCHING NUT AND METHOD OF SECURING TO A MEMBER
Hans E. Reusser, Cleveland, Ohio, assignor to Republic Steel Corporation, Cleveland, Ohio, a corporation of New Jersey
Filed Dec. 30, 1963, Ser. No. 334,420
4 Claims. (Cl. 151—41.73)

This invention relates generally to nuts and more particularly to self-piercing and clinching nuts of the type adapted to be attached to a sheet metal panel and also relates to the method of securing such nuts to a panel.

In recent years, self-piercing and clinching nuts have become very popular, particularly in the automotive and major appliance industries where there is an extremely large demand for positive and efficient means for securing screw fasteners to relatively thin sheet metal components wherein often the fasteners must necessarily be of the blind type, that is, only accessible from one side of the sheet metal member. It has been estimated that there are over 150 such fasteners involved in the assembly of one automobile. Thus, it will be readily apparent that a noticeable advantage will be gained in the provision of an improved self-piercing and clinching nut which may be applied to the sheet panel is a more rapid and efficient manner. Nuts of the subject class are not new as such. In the past, it has been found that the most practical means for insuring a positive clinching of the nut and preventing axial movement was to utilize a nut in the form of a square or rectangular blank, as such a nut mounted through a hole of corresponding shape naturally provided the maximum security against rotary displacement of the clinched nut. However, such means usually required complicated tooling for assembling the nut due to the requirement of exact rotary orientation between the rectangular or polygonal nut and the corresponding or mating edges of the opening of the piercing die. In many of the prior devices where the piercing section of the nut is rectangular, the nut is usually clinched to the panel along only two sides of the piercing section, in contrast with the instant arrangement which provides an uninterrupted circular clinching to insure an inherently more positive and fluid-tight connection. The present construction precludes the necessity of providing for rotary orientation between the nut and piercing die, it being necessary only to insure axial alignment.

The present invention resides in an improved self-piercing and clinching nut which is attached to a sheet metal panel in a one-stroke operation, wherein a punch forces the nut through a sheet metal panel disposed over a piercing die. During this operation, the leading edge of the nut stretch forms the metal panel into conformity with the surface of the die to form a dished or conically shaped depression prior to the piercing of the panel by a piercing edge of the nut. Subsequent pressure upon the face of the nut by the punch causes the outer perimeter of the face of the nut to be forced into the conical surface of the sheet and to become imbedded therein to secure the nut against rotary displacement. At the same time, the especially arranged opposed surfaces of the nut and die cause inward displacement of the conical portion of the sheet member to securely clinch the nut to the panel.

In many of the prior instances a swaging device, distinct from the nut, is utilized to form the final clinching operation. In the present invention, the nut itself becomes a swaging means and functions against an inclined surface of a fixed die to accomplish the clinching.

Experiments have shown that when a panel material has been cold-worked by the application of a flush-driven nut therethrough that the resulting assembly exhibits great stiffness and compressive resistance to collapse due to the provision of the conical mounting, as set forth above.

Another disadvantage of known devices is that complicated and expensive dies are required for mounting of the nut through a sheet member, which dies, due to their particular arrangement, are relatively short-lived, usually because of one or more necessary sharp edges thereon. In the present case a piercing die is used that is entirely circular and flat faced for simplicity and long life. This also eliminates the necessity of providing for nut orientation which is required in the case of square nuts.

The present invention represents a variation on the subject matter of applicant's co-pending application Serial No. 288,300, filed June 17, 1963. In the referred to application, a back-shouldered nut is disclosed which also provides for flush-mounting. However, the flush-mounting surface of the assembly is on the lower or underside of the sheet metal panel and the clinching means of the nut comprises a depression or recess which prevents axial displacement of the nut and includes a plurality of radial grooves adjacent the recess for preventing rotary displacement. By contrast, the present invention relates to a flush-driven nut, that is, a nut which when assembled through a panel member is flush-mounted on the entering or top side thereof and receives its rotary locking action by the provision of a plurality of points and indentations in the perimeter of the top portion of the nut.

The simplicity of an entirely circular and flat faced assembly die is highly advantageous over the apparatus required for the production of clinched fastenings comprising square piercing nuts. A square piercing nut obviously requires a corresponding square piercing die opening which carries with it the problem of providing for nut orientation to match the piercing die opening. Also, in such cases die projections for clinching the nut must have critical edges which are fast wearing. In order to make such nut assemblies flush-mounted, additional panel embossing means must be provided. Usually in these cases, the work part is moved down over the clinching and embossing die projections as opposed to the present invention where the body of sheet metal remains stationary on the flat die surface. The very manufacture of all square piercing nuts points out the disadvantage of their use. Separate steps of production and control are required. First, the bar stock must be rolled to the finished nut contour and desired hardness, then the nut blanks are cut off and the center bores punched out, with consequent distortion that complicates their application in precision automation.

Many of the present self-piercing and clinching nuts rely upon deformation of a portion of the nut subsequent to piercing through the sheet member, for the necessary clinching action. However, in the present case, there is no deformation whatsoever of the nut during its application to a metal panel.

A further improvement provided by the new conical mounting resides in the ability to utilize panel material having a wide range of thickness and still achieve a flush-mounting without the necessity of changing the piercing die as the panel thickness is varied. There is no undesirable variation in the deformation and flow of panel material during clinching, with the result that a superior degree of clinch-retention strength is obtained even when the minimum acceptable thickness of panel material is used. Prior known forms of flush-mounted nuts of the present class have been found to have a much narrower applicable range of panel thickness.

Accordingly, one of the objects of the present invention is to provide a flush-driven self-piercing and clinching nut adapted to be mounted upon a metal panel member in a one-stroke punching operation.

Another object of this invention is to provide a self-piercing and clinching nut which will present a flush or non-protruding surface on the face of the metal panel adjacent to the upper driven face of the nut.

A further object of the invention is to provide a self-piercing and clinching nut which during assembly provides angular differences between its intermediate portion and the adjacent piercing die surface to cause an improved flow of the adjacent panel material to bring about a more thorough axial locking between the two members.

Still another object of the invention is to provide a self-piercing and clinching nut having a plurality of indentations and points on the perimeter of the top portion to provide for rotary anchorage of the nut.

A further object of the invention is to provide a method of securing a self-piercing and clinching nut to a metal panel by a one-stroke clinching operation wherein the nut has its upper or driven face flush-mounted relative to the upper plane of the panel.

Another object of the invention is to provide a method of affixing a self-piercing and clinching nut to a panel member in a single continuous movement wherein a conical mounting is provided between the nut and member.

One other object of the invention is to provide a method of attaching a self-piercing and clinching nut to a panel member wherein the member is initially stretch-formed into a conical shape by the nut before the member is pierced.

With these and other objects in view, which will more readily appear as the nature of the invention is better understood, the invention consists in the novel construction, combination and arrangement of parts hereinafter more fully described, illustrated, and claimed.

Preferred and practical embodiments of the invention are shown in the accompanying drawings, in which:

FIG. 1 is a side elevation, partly in section, showing the invention and the initial stage of a cold formed nut being mounted through a metal panel by means of a punch and die wherein the stroke of the punch has reached the stretch-forming stage.

FIG. 2 is a side elevation partly in section, and illustrates the next stage during the single stroke of the punch wherein the piercing edge of the nut has cut out the slug portion and the perimeter of the top part of the nut is about to penetrate the conical surface of the stretch-formed metal.

FIG. 3 is a side elevation, partly in section, of the invention as it appears at the end of the stroke of the punch after the perimeter of the upper face of the nut is embedded in the conical surface of the sheet and a portion of the conical surface has been displaced inwardly to complete the clinching of the nut.

FIG. 4 is a perspective view with a portion broken away, illustrating a cold formed embodiment of the nut having a basically hexagon shaped upper perimeter with its points inverted or notched, as mounted to a sheet metal panel.

FIG. 5 is a partial perspective view of the portion of sheet metal panel as removed from the assembly of FIG. 4, illustrating the form of the sheet metal panel as it appears when a nut has been completely mounted thereupon.

Similar reference characters designate corresponding parts throughout the several figures of the drawings.

Figure 6:
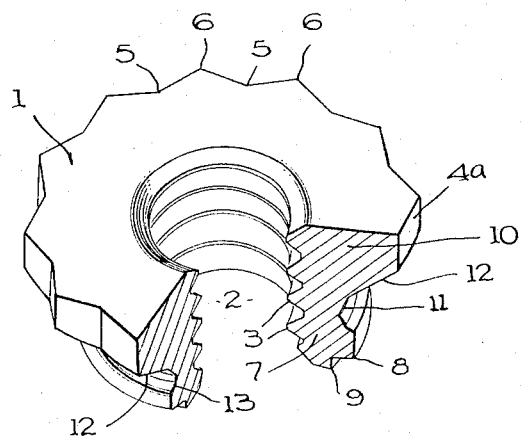
FIG. 6 is a perspective view with a portion broken away, illustrating a cold formed embodiment of the nut having a twelve point upper perimeter shape defined by two superimposed hexagons.
Figure 7:
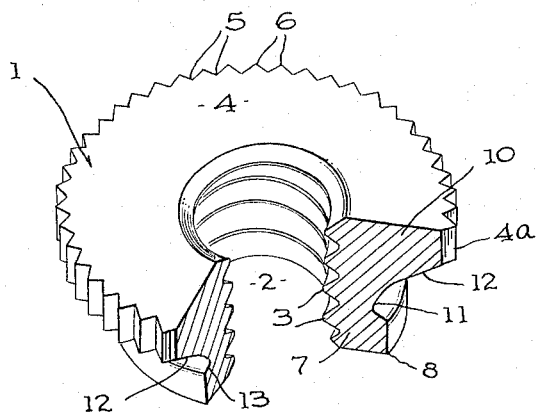
FIG. 7 is a perspective view with a portion broken away, illustrating a machine-turned embodiment of the nut having a round upper perimeter with knurled-in serrations.

Referring now to the drawings, the preferred cold formed embodiments of the flush-driven self-piercing and clinching nut illustrated in FIGURES 1, 2, 3, 4 and 6 comprise nut blanks generally designated 1, which may be produced from any suitable steel capable of work-hardening sufficiently when formed to prevent deformation of the nut during its assembly to a panel member of maximum thickness. In a machine-turned embodiment as shown in FIGURE 7, the nut blank is normally produced from any easily machined steel that can be subsequently case hardened to prevent deformation of the nut during its assembly. The blanks are provided with an axial bore 2 having suitable threads 3 added therein for the reception of an appropriate screw-type fastening element (not shown).

The flat top or upper face 4 of the nut has at its perimeter a plurality of points 6 projecting outwardly equidistant from the nut axis, with intervening indentations or notches 5, to provide a number of sharply intersecting surfaces on the vertical peripheral wall of the upper portion 10 of the nut blank, for reasons which will hereinafter be fully described. Perimeter shapes are selective for compatibility with chosen methods of nut manufacture and are by no means limited to those shown in the drawings, where the cold formed embodiments in FIGURES 4 and 6 employ, respectively, a modified hexagonal shape, and a twelve-point or superimposed double hexagonal shape. The machined embodiment in FIGURE 7 employs a basically round perimeter shape that has serrated indentations 5 added by means of knurling.

Retention of a basic hexagon shape as in FIGURE 4, lends itself to speed tapping of the nut blank, while the notches or inverted points provide excellent anchorage against torque, as indicated in FIGURE 5, as well as the necessary balance in panel material displacement for uniform circular clinching that could not be obtained with conventional hex points. The 12-point perimeter shape as in FIGURE 6 is more easily generated in cold forming, where this may be considered more advantageous than the facility for tapping offered by a hexagon.

The opposite or lower portion 7 of the nut blank is provided with a piercing edge or perimeter 8, and in the case of the cold formed nut, with a concentric downward extension 9 of less diameter than the piercing edge 8. Such extension, which is provided during the course of peripheral upset-forming of the piercing perimeter 8 and shoulder 13, is omitted only in the machined embodiment of the nut illustrated in FIGURE 7.

The upper portion 10 of the nut extending downwardly immediately beneath the upper face 4 is of substantially identical cross-section and is provided on the peripheral wall 4a thereof with the aforementioned vertical notches or indentations 5. The circular clinching recess 11 disposed substantially intermediate of the notches 5 and piercing edge 8 comprises on the one hand an inclined conical surface 12 depending from the bottom of the wall 4a of the upper portion 10 of the nut and on the other, an upset or machined shoulder 13 depending downwardly and outwardly to the piercing edge or perimeter 8.

In order to attach the nut to a sheet panel member, the panel 14 is placed between a reciprocating punch P and a stationary piercing die D. The punch P is provided with a slight shoulder 15 and an axial pilot 16 adapted to slidably fit within the threaded portion of the nut blank 1. The initial downward pressure of the punch P urging the lower portion 7 of the nut against the upper surface 14a of the sheet 14 causes the stretch forming operation as shown in FIG. 1. During this step, the leading-most portion of the cold formed nut, namely, the downward extension or reduced shoulder 9 forms the initial contact with the upper surface 14a and forces the sheet panel downwardly against the confines of the countersink or conical surface 18 of the die D towards the position shown in FIG. 1. The piercing edge or perimeter 8 does not actually contact the upper surface 14a of the sheet member until the panel has been stretch-formed as illustrated. In this manner, it will be seen that the extension or shoulder 9 serves to shield the sharp piercing edge 8 and to save this latter edge from being deformed or dulled during the initial stretch-forming of the sheet member 14. Such shielding provision is obviously unnecessary in the machined embodiment of the nut, per FIG. 7, having its piercing edge 8 case-hardened to a degree of durability that is not obtainable through work-hardening in a cold formed nut blank. FIG. 1 clearly illustrates the stretch-forming operation whereby the thickness of the panel 14 is somewhat thinner in the conical portion 17 while the thickness of the remaining horizontal portions of the panel remains unchanged. Obviously, the angle of the conical portion 17 is determined by the juxtaposed conical surfaces 18 of the circular piercing die. The conical or countersink surface 18 of the die is preferably inclined about 40° to the upper flat face 19 of the die or the upper face of the nut, while the conical surface 12 of the nut is inclined to the upper face 19 of the die or upper face 4 of the nut to a lesser degree, for example, 32°.

As the punch P progresses in its downward movement from the point as viewed in FIG. 1, the circular piercing edge or perimeter 8 is forced into the panel material against the stationary vertical piercing wall 20 forming the circular opening C of the piercing die D. As the piercing edge 8 reaches the intersection of the piercing wall 20 and the conical surface 18 of the die, it will be seen that the slug S will be divorced from the remainder of the sheet and the assembly will appear as in FIG. 2. At this stage, the lowermost edges of the peripheral wall 4a of the upper portion 10 begin to penetrate the upper surface of the conically shaped material of the sheet member.

Continued downward pressure on the nut blank causes the intersecting surfaces of the wall 4a to become embedded in the conical portion 17 of the sheet member and due to the indentations or notches 5, which form an irregular perimeter on the upper portion 10 of the nut, it will be seen that the material of the conical portion 17 will be interlocked in the area of said notches so that the nut will be prevented from any rotary displacement.

During the final portion of the stroke of the punch P and at the same time that the peripheral wall 4a of the nut is being embedded in the conical portion 17 of the sheet member, the downward pressure of the conical surface 12 of the nut toward the dissimilarly inclined conical surface 18 of the die, causes displacement of the material of the conical portion 17 at an incline into the clinch recess 11 so that the resultant assembly will be as shown in FIGS. 3 and 4.

Regardless of the particular thickness of the material 14 being operated upon, a positive clinching of the nut is achieved due to the angular differences between the conical nut and die surfaces 12 and 18, respectively. This angular difference results in a pair of diverging surfaces which insure inwardly inclined displacement of the panel material.

It can be seen that the downward stroke of punch P ends with its outer face in contact with the upper surface 14a of the panel material, thereby placing the nut face 4 slightly below flush with panel surface 14a by means of the punch shoulder 15. This is to insure that, in making a subsequent screw attachment to the nut, the attached component will properly tighten against the panel surface 14a without interference from the nut face 4. The amount of downward extension of the punch shoulder 15 is also selected to achieve proper embedment and clinching in panel sheet thicknesses ranging from the minimum to more than twice this. It will appear obvious to those versed in the art that the punch body P could consist of two concentric parts that are axially adjustable relative to each other for setting the size of the shoulder extension 15.

It will be understood that the punch P is illustrated in more or less its simplest form as it could take on many forms, including a punch provided with retaining fingers for the nut, and a retracting pilot 16 to facilitate feeding of nuts to the punch, as in an automatic machine.

From the foregoing, it will be seen that the described conical mounting, in panel material that has been cold worked by the flush-driven nut and firmly anchored in the nut recess, exhibits great stiffness and compressive resistance to collapse. In effect, the conical portion acts as a solid nut extension with a base diameter larger than the nut and rooted in the panel.

I claim:

1. A self-piercing and clinching nut adapted to be driven through a sheet member to provide flush mounting of the upper portion thereof, comprising, a nut blank having an upper face and a central axial bore, an enlarged upper portion provided with a peripheral wall extending axially from said upper face and including a plurality of intersecting planar surfaces providing inwardly directed radial notches, a circular clinching recess in the medial portion of said blank, a conical surface inclined upwardly and outwardly from the top of said recess to the bottom of said peripheral wall notches, said blank including, a lower portion of reduced diameter provided with a circular downwardly directed piercing edge on the outer periphery thereof of a diameter greater than said recess but less than said peripheral wall, a shoulder adjacent and immediately below said recess disposed with its surface projecting downwardly and outwardly, said lower portion having an axially projecting periphery extending from said piercing edge to said shoulder, and a shouldered extension axially projecting downwardly from the bottom of said blank lower portion and concentrically disposed intermediate said bore and said piercing edge.

2. A self-piercing and clinching nut according to claim 1, wherein, said planar surfaces on said peripheral wall of said upper portion comprise a plurality of vertical surfaces defining a hexagon blank, and said notches are disposed between each two adjacent vertical surfaces.

3. A method of flush-mounting and clinching a nut to a panel member in a single-stroke operation, said nut having a lower portion and an upper portion of maximum diameter provided with a plurality of peripheral indentations, a clinch recess around the medial portion of the nut, a conical surface extending from the bottom of said upper portion inwardly and downwardly to said recess, a downwardly facing piercing edge formed on the lower portion of the nut; comprising, placing said member between the nut and a die having a downwardly and inwardly directed conical surface surrounding an axial bore of a diameter no less than said piercing edge with said die conical surface inclined downwardly a greater degree than said nut conical surface, applying pressure to the upper portion of the nut whereby said lower portion forces said member into inclined engagement with said conical surface of said die while radially stretching so much of said member overlying said conical surface, continuing pressure on said nut to force said piercing edge to cut an opening through said member over the axial bore in said die, and further continuing pressure on said nut to bring said nut indentations into contact with the radially stretched portion of said member overlying said die conical surface and to radially displace the conically formed stretched portion of said member inwardly into said recess while concurrently embedding said indentations into the stretched surface of said member.

4. A method of flush-mounting a self-piercing and clinching nut to a panel member in a single-stroke operation, said nut having an upper portion of maximum diameter provided with a plurality of peripheral indentations, a lower portion having a piercing edge and a shouldered extension of lesser diameter projecting downwardly further than said piercing edge, and a medial clinching recess; comprising, placing said member over a die having an axial bore surrounded by a downwardly and inwardly directed conical surface, applying pressure to the upper portion of the nut whereby said shouldered extension stretch-forms the member against said die conical surface, continuing pressure upon the nut to force said piercing edge to engage and then cut through the member over said axial bore, further continuing pressure upon the nut bringing said upper portion and indentations into engagement with the stretch-formed member and forcing said die conical surface to radially displace the stretch-formed member inwardly into said medial recess to provide axial clinching while concurrently forcing said peripheral indentations into the stretched member to provide rotary clinching.

References Cited by the Examiner

UNITED STATES PATENTS

| | | | |
|---|---|---|---|
| 1,479,358 | 1/1924 | Behringer | 151—41.72 |
| 2,707,322 | 5/1955 | Strain et al. | 151—41.73 |
| 3,079,970 | 3/1963 | Barry | 151—41.73 |
| 3,093,887 | 6/1963 | Prestige et al. | 151—41.73 |
| 3,117,611 | 1/1964 | Matthews | 151—41.73 |

FOREIGN PATENTS

| | | |
|---|---|---|
| 1,300,424 | 6/1962 | France. |
| 934,157 | 8/1963 | Great Britain. |

CARL W. TOMLIN, *Primary Examiner.*

EDWARD C. ALLEN, *Examiner.*

M. PARSONS, JR., *Assistant Examiner.*